Patented July 5, 1949

2,475,440

UNITED STATES PATENT OFFICE 2,475,440

PROCESS FOR THE PREPARATION OF 3,6-DIAMINO-1,4-DIHYDRO-1,2,4,5-TETRAZINE

Henry A. Walter, Longmeadow, Mass., assignor to Monsanto Chemical Company, St. Louis, Mo., a corporation of Delaware No Drawing. Application December 7, 1945, Serial No. 633,523

6 Claims. (Cl. 260—239)

This invention relates to a process for the preparation of 3,6-diamino-1,4-dihydro-1,2,4,5-tetrazine.

It is an object of this invention to provide a process for the preparation of 3,6-diamino-1,4-dihydro-1,2,4,5-tetrazine.

This and other objects are attained by reacting hydrazine or hydrazine hydrate with carbamic acid esters at super atmospheric pressure.

The following example is given in illustration and is not intended to limit the scope of this invention. Where parts are mentioned they are parts by weight.

Example 180 parts of ethyl carbamate and 90 parts of an aqueous solution of hydrazine hydrate (85% hydrazine hydrate) were placed in a closed vessel and heated at 140° C. for 20 to 22 hours and then cooled. A white solid was obtained which was dissolved in boiling water and recrystallized. On analysis it was found that the crystals were pure 3,6-diamino-1,4-dihydro-1,2,4,5-tetrazine.

The temperature of the reaction may be varied from 120 to 175° C. with resultant variation in the duration of the heat treatment, i. e., at higher temperatures the reaction may be completed in considerably less time. The reaction is carried out in a closed vessel, such as an autoclave which results in the development of super atmospheric pressures which also increase the rate of the reaction.

The molar ratio of carbamic acid ester to hydrazine should be 1 or greater than 1. If an excess of hydrazine is used, the reaction proceeds further to produce a substituted tetrazine in which one hydrogen of each amino group is replaced by an NH$_2$ group.

In place of the ethyl carbamate shown in the example, other alkyl carbamates such as propyl, butyl, amyl, octyl, etc., carbamates may be reacted with hydrazine to produce 3,6-diamino-1,4-dihydro-1,2,4,5-tetrazine.

The process of this invention provides a simple and practical method for obtaining pure 3,6-diamino-1,4-dihydro-1,2,4,5-tetrazine.

3,6-diamino-1,4-dihydro-1,2,4,5-tetrazine is a valuable compound used to make aminoplasts by reaction with various aldehydes.

The foregoing is given in illustration and not in limitation of this invention as set forth in the appended claims.

What is claimed is:

1. A method for the preparation of 3,6-diamino-1,4-dihydro-1,2,4,5-tetrazine which comprises reacting an alkyl carbamate with hydrazine.

2. A method for the preparation of 3,6-diamino-1,4-dihydro-1,2,4,5-tetrazine which comprises reacting ethyl carbamate with hydrazine.

3. A method for the preparation of 3,6-diamino-1,4-dihydro-1,2,4,5-tetrazine which comprises reacting an alkyl carbamate with hydrazine hydrate.

4. A method for the preparation of 3,6-diamino-1,4-dihydro-1,2,4,5-tetrazine which comprises reacting ethyl carbamate with hydrazine hydrate at 120° to 175° C.

5. A method for the preparation of 3,6-diamino-1,4-dihydro-1,2,4,5-tetrazine which comprises reacting ethyl carbamate with hydrazine hydrate at 140° C. for 20 to 22 hours.

6. A method for the preparation of 3,6-diamino-1,4-dihydro-1,2,4,5-tetrazine which comprises reacting an alkyl carbamate with a compound taken from the group consisting of hydrazine and hydrazine hydrate.

HENRY A. WALTER.

REFERENCES CITED

The following references are of record in the file of this patent:

Fieser et al., "Organic Chemistry" (D. C. Heath & Co., Boston, 1944), page 219.

Gilman, "Organic Chemistry," vol. I (John Wiley, New York, 1938), pages 680–681.

Wieland, "Die Hydrazine" (published in Stuttgart, 1913), pages 192 and 193.